United States Patent [19]

Carpenter

[11] Patent Number: 5,669,100

[45] Date of Patent: Sep. 23, 1997

[54] CASTOR LOCKING DEVICE WITH FREELY PIVOTABLE CURVED TONGUE ENGAGEMENT

[76] Inventor: Graham Scott Carpenter, 26 Murray St., Goulburn, Australia

[21] Appl. No.: 606,677

[22] Filed: Feb. 26, 1996

Related U.S. Application Data

[63] Continuation of Ser. No. 274,972, Jul. 14, 1994, abandoned.

[30] Foreign Application Priority Data

Jul. 15, 1994 [AU] Australia .................... PL9977

[51] Int. Cl.$^6$ .................................. B60B 33/02
[52] U.S. Cl. ........................ 16/35 R; 280/35.994
[58] Field of Search .................. 16/35 R; 280/33.991, 280/33.992, 33.994

[56] References Cited

U.S. PATENT DOCUMENTS

| | | |
|---|---|---|
| 2,253,824 | 8/1941 | Townsend et al. ............... 16/35 R |
| 3,070,828 | 1/1963 | Clinton et al. ................... 16/35 R |
| 3,112,121 | 11/1963 | Hummer ......................... 16/35 R |
| 3,142,086 | 7/1964 | Thomas . | |
| 4,847,945 | 7/1989 | Schwartz et al. ................. 16/30 |
| 4,922,574 | 5/1990 | Heiligednthal et al. .......... 16/35 R |

FOREIGN PATENT DOCUMENTS

| | | |
|---|---|---|
| 023 432 | 7/1980 | European Pat. Off. . |
| 403 265 | 6/1990 | European Pat. Off. . |
| 3525 443 A | 1/1987 | Germany . |
| 3546 043 A | 6/1987 | Germany . |
| 7613 360 | 6/1978 | Netherlands . |
| 2234945 | 2/1991 | United Kingdom ............. 280/33.991 |

*Primary Examiner*—Daniel W. Howell
*Assistant Examiner*—Kenneth J. Hansen
*Attorney, Agent, or Firm*—Darby & Darby

[57] ABSTRACT

A device for arresting the swivelling movement of a castor. The device (2) is particularly useful for use on a shopping trolley (1). The device comprises support means (1) secured to the base of the trolley, and engagement means (11) adapted to pivot between first and second positions. In a first position, a tongue (11) is engaged between the arms (5) and (6) of the fork member (4) to prevent swivelling movement of the castor. In a second position, the tongue (11) is disengaged from between the arms (5) and (6) of the fork (4) to permit swivelling movement of the castor (3) relative to the base of the trolley (1).

22 Claims, 6 Drawing Sheets

CASTOR LOCKING DEVICE WITH FREELY PIVOTABLE CURVED TONGUE ENGAGEMENT

This is a continuation of application Ser. No. 8/274,972, filed Jul. 14, 1994 now abandoned.

BACKGROUND OF THE INVENTION

The present invention relates to a device for arresting the swivelling movement of a castor, which is particularly useful, but not limited, to a castor(s) provided on a shopping trolley.

The present invention relates to such a device which may easily be adapted to existing trolleys, or be incorporated into newly manufactured trolleys.

DESCRIPTION OF THE PRIOR ART

It is commonly known to persons who have pushed a trolley such as a shopping trolley, an airport trolley, a baby stroller, or any other trolley like apparatus, that the wheels quite commonly do not move in the desired direction. Such trolleys usually have four castors mounted on the bottom of the apparatus, each able to be swivelled to point in a desired direction of movement.

The front wheels of such trolleys are prone to swivel into a direction transverse to the desired direction of movement such that it is often very difficult to get the trolley to move in a forward direction.

Various attempts have been made to produce lockable castor devices whereby this swivelling movement of one or more castors on a trolley is arrested. Such prior art devices include the following.

AU-A-60830/80 by N. A. Fisher discloses a lockable castor, particularly for use with a shopping trolley. The castor is provided with a latching mechanism 24 which is pivotally attached about bolt 10, which has a pin 29 which can locate in a notch 22 which is provided in annulus 21, to thereby prevent swivelling movement of the castor.

AU 541238 by Manfred Neumann discloses a device to prevent swivelling of a castor, particularly for use on a moveable hospital bed. The device operates by actuation of rod 8, which operates cam 7 to thereby move a locking pin 11 downwards, such that a head 17 engages with matching teeth of a pawl 18, to form the corresponding locking member in hollow 16 of fork 2, such that swivelling movement of fork 2 is arrested. It also acts as a brake element to prevent rotation of wheel 1.

AU 561639 by Edward Robson discloses an anti-swivel lockable castor, particularly for use on a baby stroller. It utilises a movable locking member 36 secured about a post 12 between a first position whereby rotation of said rotatable member is prevented by a slot interferingly engaging the rotatable member, and a second position whereby rotation of said rotatable member is permitted.

AU-A-17214/92 by Geoffrey Grant discloses a locking mechanism for releasably locking a wheel of a shopping trolley. The device comprises a yoke 3, which is provided with a ring attachment 7 secured thereto. The ring 7 is provided with an indent which corresponds with a spring biased ball 9. The spring biased ball 9 is able to be moved out against the bias spring 11 so that the wheel can be swivelled.

All of the aforementioned prior art devices are somewhat complex in design, difficult to manufacture, and are prone to breakage, such that they are not considered suitable for attachment to shopping trolleys or the like, in a readily useable and/or cost effective manner.

SUMMARY OF THE INVENTION

The present invention seeks to provide a device for arresting the swivelling movement of a castor, particularly, but not limited to, being attachable to a shopping trolley or the like, whereby a simple, inexpensive, and easy to use device is enabled.

In one broad form, the present invention provides a device for arresting the swivelling movement of a castor, said castor being of the type having a fork-type attachment means, an upper end of said attachment means being rotatable relative to a base portion of a trolley or the like, and, a lower end of said attachment means having an axle between arms of said fork-like attachment means to which said castor is attached, said device comprising:

support means, secured to said base of said trolley or the like; and, engagement means, comprising a tongue-like member pivotally attached to said support means, and adapted to be displaced between first and second positions;

whereby, in said first position, said tongue is engaged between said arms of said fork thereby preventing swivelling movement of said castor relative to said base; and, in a second position, said tongue is disengaged from between said arms of said fork to thereby permit swivelling movement of said castor relative to said base.

Preferably, said device is manufactured integrally with said trolley or the like.

Alternatively, but also preferably, said device is adapted to said trolley or the like after manufacture.

In a preferred form of the invention, but not being limited thereto, said trolley or the like is a shopping trolley.

In a preferred form of the invention, said device is attached to the front wheels of said trolley or the like.

Preferably, a connecting bar connects said engagement means to an engagement means on an adjacent device, such that said devices operate simultaneously.

In a preferred embodiment, said device may be manually operated by an operator moving said engagement means.

In an alternatively preferred embodiment, said device may be operated from a remote position by means of a tension cable connected to a switch means.

In this latter form of the invention, said switch means is provided on a handle portion of said trolley or the like.

In yet a further preferred form of the invention, said device may be operated by a disengaging means, to automatically disengage said tongue from between said arms of said fork, when said trolley is stored or stacked with other trolley(s), said disengaging means being operated by contact from said other trolley(s).

BRIEF DESCRIPTION OF THE DRAWINGS

The present invention will become more fully understood from the following detailed description of a preferred but non-limiting embodiment thereof, described in connection with the accompanying drawings wherein.

DETAILED DESCRIPTION OF PREFERRED EMBODIMENTS

Throughout the drawings, like numerals will be utilised to identify similar features, except where expressly otherwise indicated.

Figure 1:
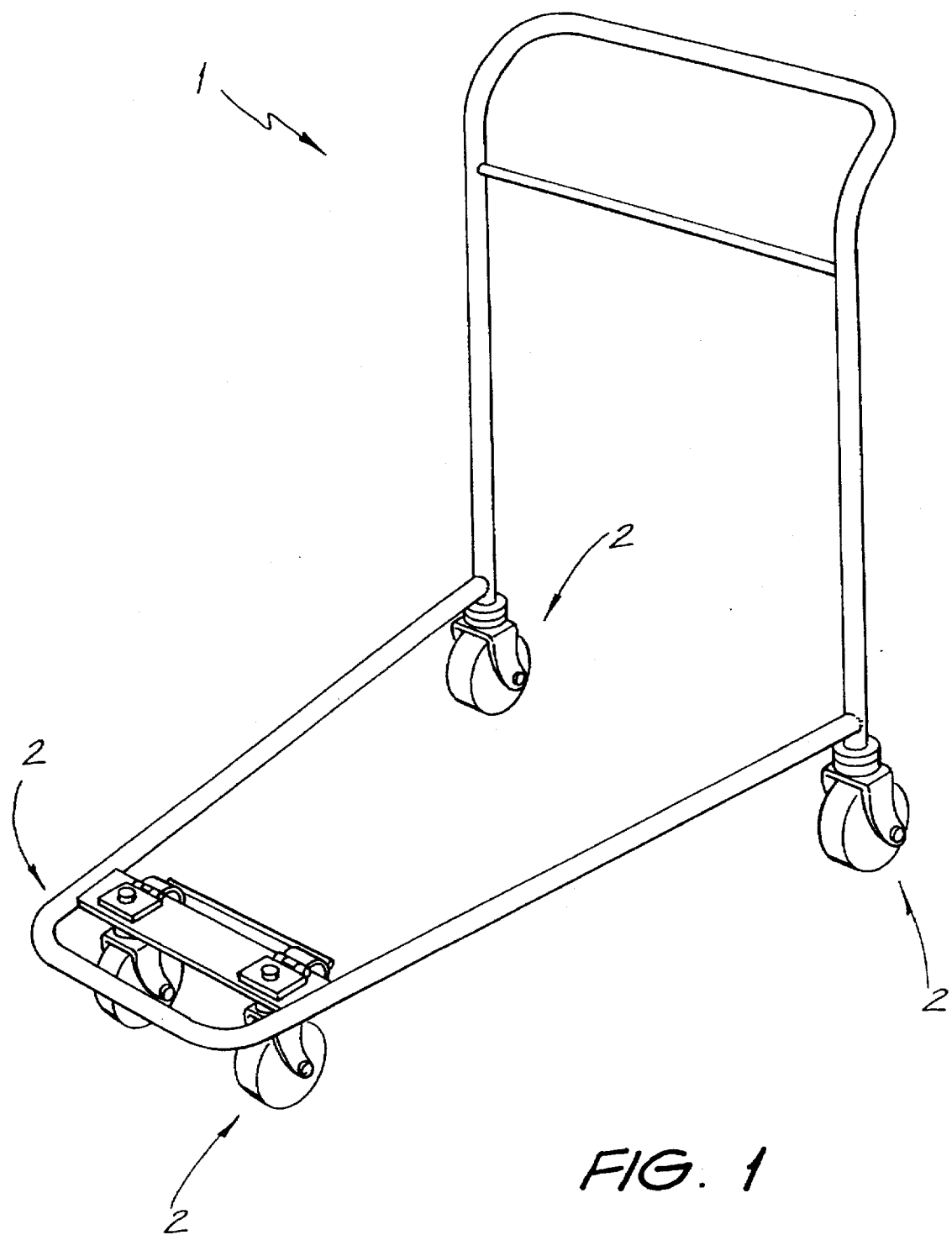
FIG. 1 illustrates an isometric view of a trolley and castors thereon in accordance with the present invention.

As shown in FIG. 1, a trolley, which may be a shopping trolley, a luggage trolley, or any other form of trolley such as a baby stroller or the like, is generally designated by the numeral 1, and is provided with four castors 2 thereon, two at the front and two at the rear of the trolley.

Figure 2:
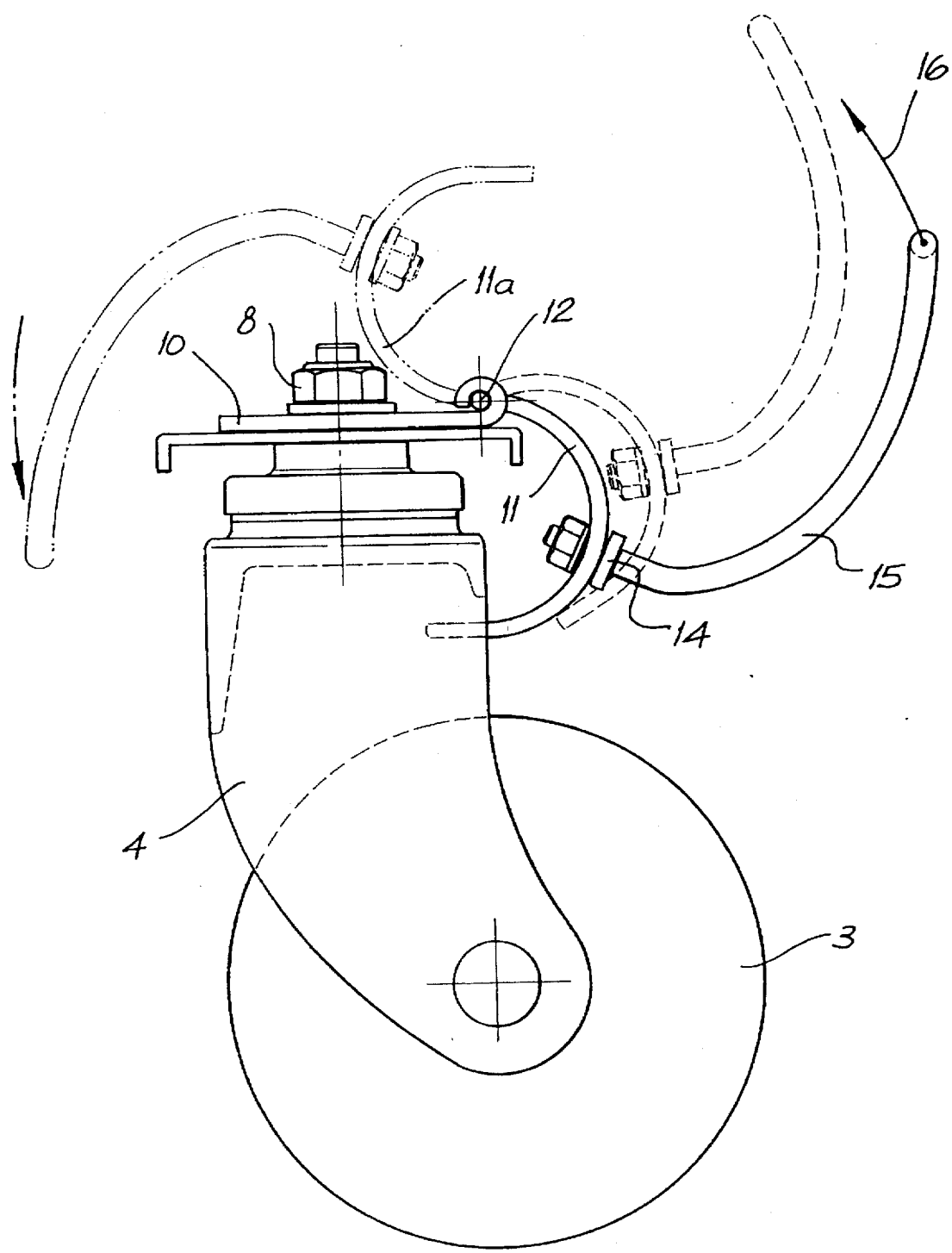
FIG. 2 shows an elevational view of a castor having the device of the present invention thereon.

The rear castors 2 of the trolley 1 shown in FIG. 1 are of a conventional type whereby swivelling movement is permitted about the length of the trolley, whilst the front castors are of a similar type, but are provided with arresting devices in accordance with the present invention thereon, operable such that those front castors are able to be locked into a forward moving position of the trolley. Details of the locking arrangement are shown in FIGS. 2 and 3.

Figure 3:
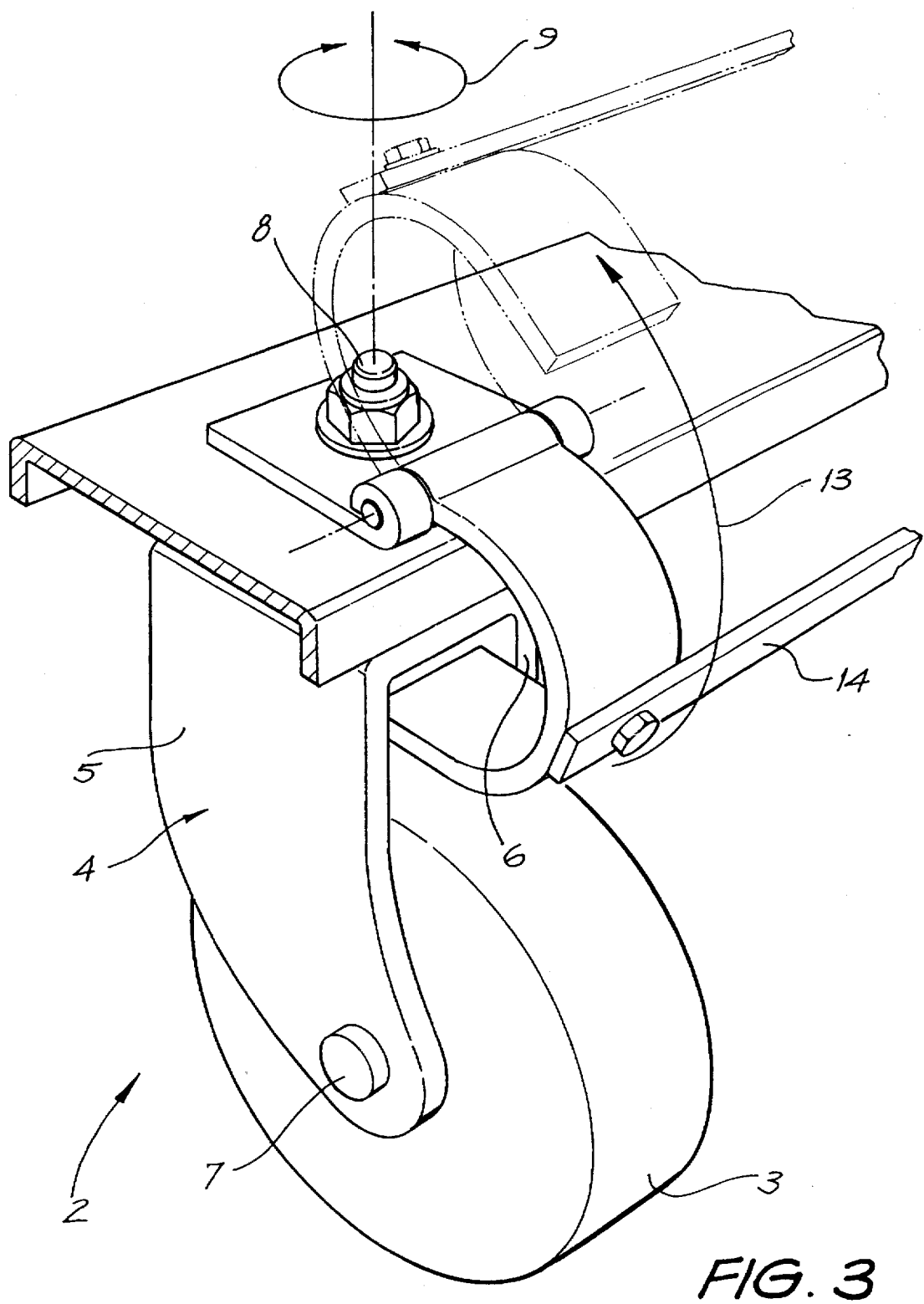
FIG. 3 illustrates an isometric view of the device of the present invention; and, FIG. 4 shows a pair of trolleys being 'stacked', automatically releasing the tongues from between the arms.

As best illustrated in FIG. 3, the castors or wheels 3 are attached to a leg or base portion of the trolley by a bolt 8, via a U-shaped member or a fork-like member 4. The fork like member 4, has a pair of arms 5 and 6 spanning either side of the wheel or castor 3 and supporting the wheel or castor 3 by an axle 7 connected therebetween. Consequently, rotatable movement in the direction shown by arrow 9 (see FIG. 3) is permitted.

The device of the present invention may be interconnected by the bolt 8 to the known trolley system by attachment of a support means 10, which is shown as a base plate or the like. Alternatively some form of support means may be simply welded or bolted or the like to the leg or bottom of the trolley.

The device of the present invention is also provided with engagement means, which comprises a tongue like member pivotally attached to the support means by a pivot 12, such that it is adapted to be displaced between the first position shown by numeral 11a, and a second position shown by numeral 11b. In the first position, the engagement means fits between the arms 5 and 6 of the fork member 4, such that rotational movement in the direction of arrows 9 is prohibited. In a second position, as shown by numeral 11b, when the engagement means 11 moves in the direction of arrow 13, the tongue is disengaged from between the arms 5 and 6, such that pre-swivelling movement of the wheel or castor 3 in the direction of arrow 9 is prohibited. It will be appreciated that such an arrangement may easily be adapted to existing trolleys or may be manufactured integrally with the trolley.

It will also be appreciated that while a particularly useful application of the device is for a shopping trolley, such devices may likewise be adapted to a luggage trolley, a baby stroller or any other type of wheeled device.

It will also be appreciated that whilst the device of the present invention may be adapted to any of the wheels of the trolley, the inventor has realised that it is particularly useful to be adapted to the front wheels only of a shopping trolley, which would then facilitate easier movement of the shopping trolley.

A connecting bar illustrated by the numeral 14 may additionally be provided to interconnect two such devices provided on two adjacent front or rear wheels of the trolley, such that, by operation of one of the devices, the interconnected device simultaneously moves. This may be effected by manual operation by an operator, for instance, by hand or foot movement, or, in a more sophisticated version of the invention, the device may be operated from a remote position by means of a suitable tension cable 18 connected to a switch 19, provided, for example, on the handle portion 20 of the trolley.

Figure 4:
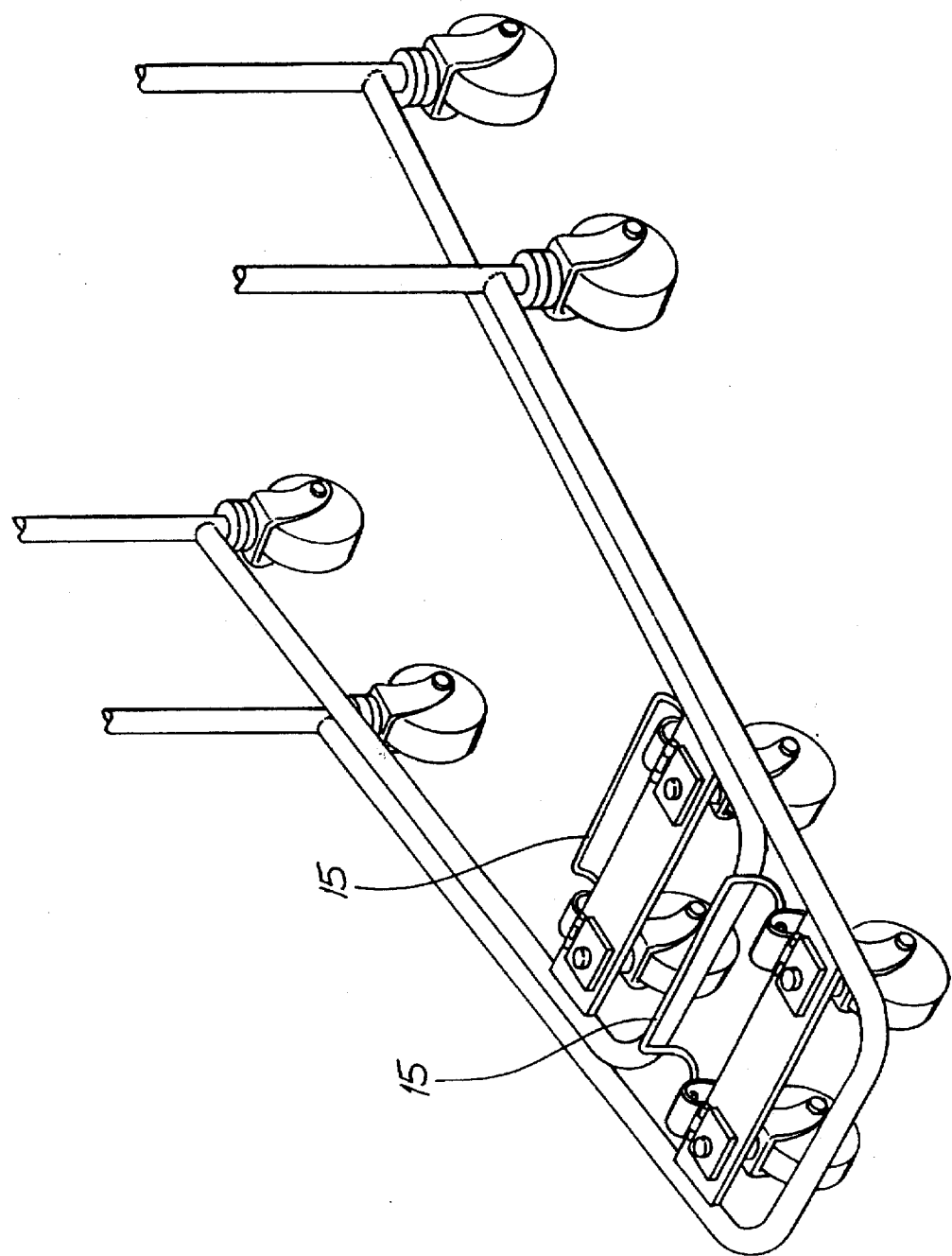

An alternatively preferred version of the invention provides a disengaging means 15, connected to the tongue 11, such that, by movement of the disengaging means 15 in the direction of arrow 16, the tongue 11 is disengaged from the arms of the fork member 4. The disengaging means 15 may be automatically raised by contact with another trolley, and particularly the front bar of another trolley, as best illustrated in FIG. 4. Therefore, when the trolleys are provided in a "stacked position", the wheels would automatically be provided in the disengaged position. This is particularly useful in the "stacked position", since the "stack" of trolleys would then be easily manoeuvrable. It should be noted that, in a preferred embodiment, the disengaging means 15 may be moved by contact with another trolley to a position whereby, when the other trolley is brought out of contact, the tongue automatically falls back into the engaged position.

Figure 5:
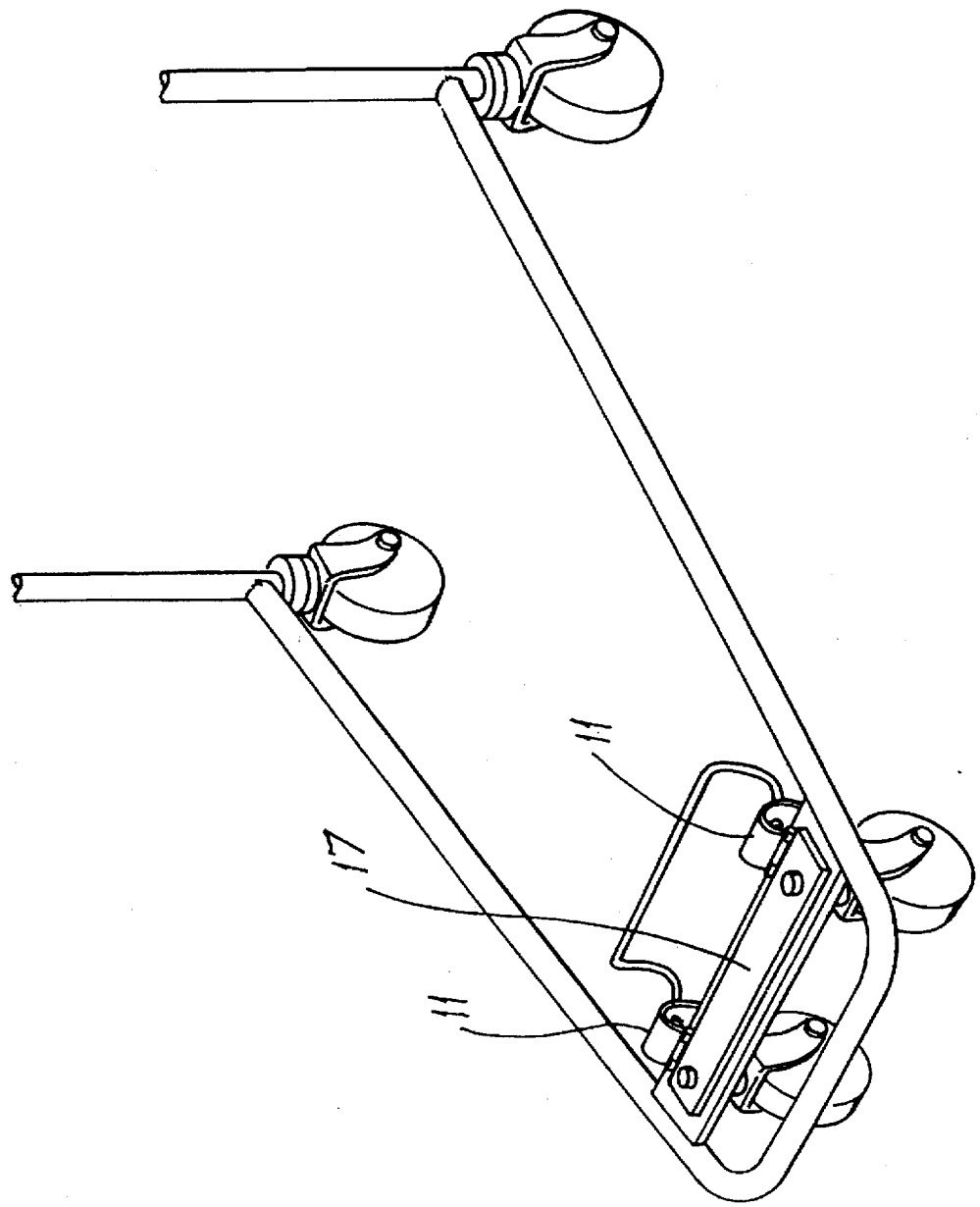
FIG. 5 shows a preferred embodiment, comprising interconnected tongues, for ease of fixture; and, FIG. 6 shows an enlarged view of FIG. 5.
Figure 6:
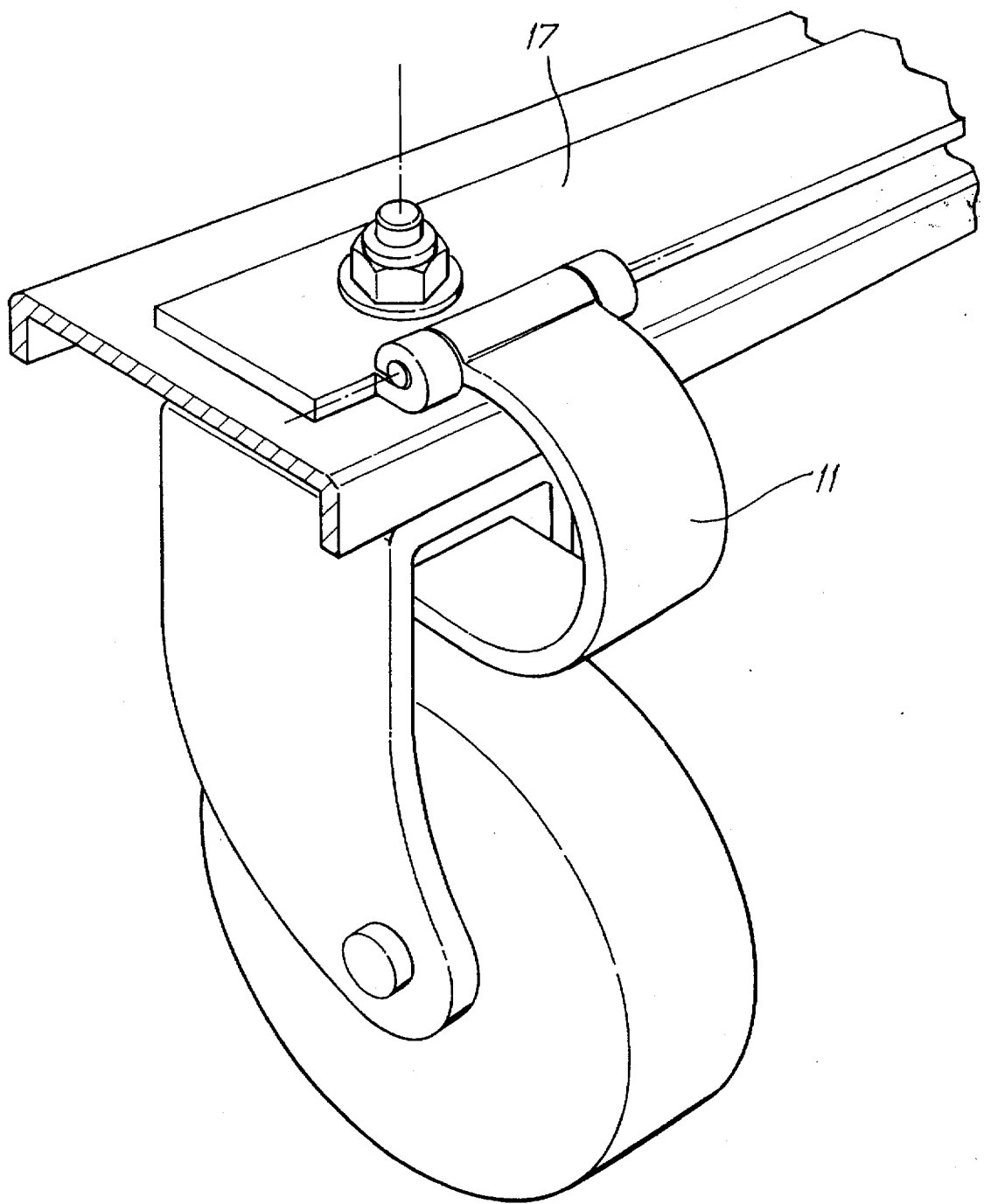

A preferred embodiment of the invention, for attaching to existing trolleys is shown in FIG. 5, and detailed in FIG. 6. These figures illustrate how the two tongues 11 are attached to a connecting bar 17 and bolted above the front wheels of the trolley. Such an arrangement facilitates easier connection such that alignment is easier. This also means that the two tongues 11 will be provided into an out of the engaged position simultaneously.

It will be appreciated that various alterations or modifications to the invention will become apparent to persons skilled in the art. All such variations and modifications should be considered to fall within the scope of the invention as broadly described hereinbefore and as claimed hereinafter.

I claim:

1. A device for arresting the swivelling movement of a castor, said castor having a fork-type attachment means with a pair of depending arms, an upper end of said attachment means being rotatable relative to a base portion of a trolley so that said castor is capable of swivelling about a vertical castor rotation axis, and a lower end of said attachment means having an axle between said arms of said fork-type attachment means to which said castor is attached for rotation about a substantially horizontal wheel rotation axis extending along said axle, said device comprising:

support means, secured to said base of said trolley and having an upper surface facing away from said castor; and engagement means, comprising a tongue having a first end pivotally attached to said support means and a second end curved with respect to said first end and adapted to be displaced between first and second positions, said first end of said engagement means being pivotally attached at an attachment location on said upper surface of said support means spaced apart from both said castor rotation axis and said wheel rotation axis, said engagement means extending from said first end to said second end in a direction away from said castor rotation axis;

wherein:

said engagement means is freely pivotally moveable between said first and second positions;

in said first position, said second end of said tongue engages and spans between said arms of said fork-type attachment means, thereby preventing swivelling movement of said castor relative to said base about said castor rotation axis; and in said second position, said second end of said tongue is disengaged from between said arms of said fork-type attachment means and is positioned above said upper surface of said support means, the weight of said tongue maintaining said second end of said tongue in said second position without requiring engagement with a movement inhibiting element, such that swivelling movement of said castor relative to said base about said castor rotation axis is permitted.

2. A device as claimed in claim 1, wherein said device is formed integrally with said trolley.

3. A device as claimed in claim 1, wherein said support means of said device includes means for interconnecting said device to said trolley after manufacture of said trolley.

4. A device as claimed in claim 3, wherein said trolley or the like is a shopping trolley.

5. A device as claimed in claim 4, wherein said device is attached to the front wheels of said trolley.

6. A device as claimed in claim 5, wherein a connecting bar connects said engagement means to an engagement means on an adjacent device, such that said devices operate simultaneously.

7. A device as claimed in claim 6, wherein said device may be manually operated by an operator moving said engagement means.

8. A device as claimed in claim 6, wherein said device may be operated from a remote position by means of a tension cable connected to a switch means.

9. A device as claimed in claim 8, wherein said switch means is provided on a handle portion of said trolley.

10. A device as claimed in claim 6, wherein said device may be operated by a disengaging means, to automatically disengage said tongue from between said arms of said fork, when said trolley is stored or stacked with one or more other trolleys, said disengaging means being operated by contact from said one or more other trolleys.

11. A device as claimed in claim 1, wherein said trolley is a shopping trolley.

12. A device as claimed in claim 11, wherein said device is attached to the front wheels of said trolley.

13. A device as claimed in claim 1, wherein said device is attached to the front wheels of said trolley.

14. A device as claimed in claim 13, wherein a connecting bar connects said engagement means to an engagement means on an adjacent device, such that said devices operate simultaneously.

15. A device as claimed in claim 1, wherein a connecting bar connects said engagement means to an engagement means on an adjacent device, such that said devices operate simultaneously.

16. A device as claimed in claim 15, wherein said device may be manually operated by an operator moving said engagement means.

17. A device as claimed in claim 1, wherein said device may be manually operated by an operator moving said engagement means.

18. A device as claimed in claim 1, wherein said device may be operated from a remote position by means of a tension cable connected to a switch means.

19. A device as claimed in claim 1, wherein said device may be operated by a disengaging means, to automatically disengage said tongue from between said arms of said fork, when said trolley is stored or stacked with one or more other trolleys, said disengaging means being operated by contact from said other trolleys.

20. A device as claimed in claim 1, wherein said tongue is flat and curved from said first end to said second end such that it extends away from said attachment location and then curves toward said wheel rotation axis and back toward said castor rotation axis when said tongue is in said first position.

21. A device as claimed in claim 20, wherein said arms have interior surfaces and said tongue extends between said interior surfaces in said first position.

22. A device as in claim 1, wherein said tongue has a substantially rectangular cross section and a major portion thereof extends along a plane substantially perpendicular to said arms of said fork-type attachment.

* * * * *

UNITED STATES PATENT AND TRADEMARK OFFICE
CERTIFICATE OF CORRECTION

PATENT NO. : 5,669,100
DATED : Sep. 23, 1997
INVENTOR(S) : Graham S. Carpenter

It is certified that error appears in the above-indentified patent and that said Letters Patent is hereby corrected as shown below:

On title page, [30], Foreign Application Priority Data, change "Jul. 15, 1994" to --Jul. 15, 1993--.

Signed and Sealed this

Twenty-fourth Day of March, 1998

Attest:

BRUCE LEHMAN

Attesting Officer

Commissioner of Patents and Trademarks